(12) United States Patent
Robert et al.

(10) Patent No.: US 7,647,623 B2
(45) Date of Patent: Jan. 12, 2010

(54) APPLICATION LAYER INGRESS FILTERING

(75) Inventors: Jean-Marc Robert, Ottawa (CA); Dmitri Vinokurov, Ottawa (CA)

(73) Assignee: Alcatel Lucent, Paris (FR)

( * ) Notice: Subject to any disclaimer, the term of this patent is extended or adjusted under 35 U.S.C. 154(b) by 744 days.

(21) Appl. No.: 11/250,455

(22) Filed: Oct. 17, 2005

(65) Prior Publication Data

US 2007/0086338 A1    Apr. 19, 2007

(51) Int. Cl.
*H04L 29/06* (2006.01)
*G06F 15/16* (2006.01)
*G06F 12/14* (2006.01)
*G06F 12/16* (2006.01)
*G06F 15/173* (2006.01)

(52) U.S. Cl. .............. 726/1; 726/11; 726/22; 726/23; 713/153; 713/188; 709/223

(58) Field of Classification Search ........... None
See application file for complete search history.

(56) References Cited

U.S. PATENT DOCUMENTS 6,453,419 B1 * 9/2002 Flint et al. ............. 726/3
6,513,122 B1 * 1/2003 Magdych et al. ........... 726/23
2004/0259640 A1 * 12/2004 Gentles et al. ............ 463/42

OTHER PUBLICATIONS

Cuervo, F., et al., Megaco Protocol Version 1.0, The Internet Society, Nov. 2000.
Ferguson, P., Network Ingress Filtering: Defeating Denial of Service Attacks Which Employ IP Source Address Spoofing, The Internet Societ, May 2000.
Rosenburg, J., et al., SIP: Session Initiation Protocol, The Internet Society, Jun. 2002.

* cited by examiner

*Primary Examiner*—Kaveh Abrishamkar
(74) *Attorney, Agent, or Firm*—Kramer & Amado, P.C.

(57) ABSTRACT

A method and system for filtering malicious packets received at the edge of a service provider (SP) domain is provided. A protocol aware border element identifies the protocol used by any ingress packet, and then determines which domain-specific information is used in the application payload of the packet to form the source identity. If this packet pretends to come from the SP domain, and no domain entity is allowed to roam, the packet is identified as illegitimate and is subjected to a given security policy. The border element also identifies as legitimate the SP domain entities that are allowed to roam, and legitimate sources outside said SP domain that communicates customary with entities in the SP domain.

16 Claims, 2 Drawing Sheets

APPLICATION LAYER INGRESS FILTERING

FIELD OF THE INVENTION

The invention is directed to communication networks and in particular to an application layer ingress filtering.

BACKGROUND OF THE INVENTION

The reliability and security of an IP network is essential in a world where computer networks are a key element in intra-entity and inter-entity communications and transactions. The original Internet protocols were designed on the basis that system users would connect to the network for strictly legitimate purposes; as a consequence, no particular consideration was given to security issues at that time. In recent years, however, the incidence of malicious attacks on the communication networks has grown to alarming proportions.

Among various classes of malicious attacks recognized today, denial of service (DoS) attacks often lead to a complete disruption of the targeted service. DoS attacks can particularly harm e-commerce providers by denying them the ability to serve their clients, which leads to loss of sales and advertising revenue; the patrons may also seek competing alternatives (Amazon, E*Trade, and eBay are among recent victims). DoS attacks may take a variety of forms. Some involve use of specially constructed packets designed to take advantage of flaws in the software. Other types of DoS attacks are designed with a view to tie up resources within devices. Thus, an attacker may flood a victim network or server with a large volume of traffic, consuming critical system resources such as bandwidth, CPU capacity, etc. As an example, the widely spread transmission control protocol (TCP) layer software uses buffers to handle handshaking exchanges of messages used to establish a communication session. Each connection request consumes a portion of the finite memory space allotted to these buffers. A large number of connection requests received in a short period of time will consume the allotted memory space making the system unable to respond to legitimate requests and potentially causing the system to crash due to buffer overloads.

Distributed DoS (DDoS) attacks can be even more damaging, as they involve creating artificial network traffic from multiple sources simultaneously. The malicious traffic may be generated simultaneously from multiple points on the network from terminals that have been "hijacked" or subverted by the attacker. A notable form of DDoS attack is access link flooding that occurs when a malicious party directs spurious packet traffic over an access link connecting an edge network of an enterprise to the public Internet. This traffic flood, when directed at a victim edge network, can inundate the access link, usurping access link bandwidth from the VPN tunnels operating over that link. As such, the attack can cause partial or total denial of the VPN service and disrupt operations of any mission-critical application that relies on that service.

Transmission Control protocol (TCP), which operates at the OSI transport layer (L4), deals with fundamental level of reliability and data transfer, including flow control, error handling and problems involved with transmission and reception of packets. The transport packet includes the user-originated data and all information the network needs to transport this data from one the source to the destination; as such, the packet includes the addresses of the originator (IP source address) and of the intended receiver (IP destination address). In order either to hide the origin of an attack or to make an attack essentially effective, attackers generally disguise (spoof) the true origin of the malicious packets, by forging malicious packets with bogus source identities. This makes often attack mitigation techniques inefficient.

The IP source addresses are not the unique source information for the attackers. Both the real identity of the sender and the source of a given flow (herein referred to as "source identity") are carried at application layer, in the payload of the IP packet. Typically, these Layer 5/7 protocols use the network identities (IP address or domain name) together with some locally unique prefixes as entity identifiers, for example aaln/2@rgw2.whatever.net or sip:johndoe@192.168.0.1. This information is legitimately used for routing purposes, NAT traversal, subscriber or request initiator identification, etc. However, attackers may also spoof both the IP address and the domain name of the application layer packets, termed here as "identity spoofing", or "application layer attacks".

The existent Layer 2/3 security mechanisms filtering malicious packets and frames are useless against Layer 5/7 identity spoofing that affects protocol-aware application only. The traditional ways to prevent or to detect identity spoofing include application-level endpoint authentication (AH in Megaco Protocol, IETF RFC 3015, or Digest Authentication in Session Initiation Protocol, IETF RFC 3261), use of IP anti-spoofing mechanisms close to the source such as DHCP snooping with ingress/egress filtering (IETF RFC 2827), and verification of the correspondence between Layer 3 and Layer 5/7 identification information.

However, the currently available solutions are deficient in that they use proprietary solutions and are usually threat-specific. Each of the above identified solutions has its own limitations in terms of applicability, performance or types of attacks it could mitigate or detect. Furthermore, false positives may be produced as a result of identity correspondence verification between L3 and L5/7 identities; the mere fact of discrepancy between L3 and L5/7 data may not always serve as a sign of malicious spoofing. This is because the mapping between the L3 identities may legitimately be different from L5/7 identities as a result of intermediate network entities interference, or user's mobility support.

A more generic approach is to validate the expected protocol behavior, which is generally referred to as "protocol anomaly detection." With this approach, the compliance to a protocol specification is controlled, as well as the way the protocol is being used. Alerts are issued as soon as deviations from the expected behavior are observed. These capabilities are integrated into Check Point FW-1 NG, Juniper NetScreen-IDP and some other intrusion detection systems. However, detection of unexpected behavior implies monitoring of protocol messages exchange for individual flows and/or gathering statistical information. In the first case, the first bogus packet of each flow must reach the recipient anyways and thus the attacker achieves his/her goal. In the second case, statistics-based decisions do not identify individual malicious flows but simply detect abnormal behavior in a given time period, which may not always indicate a malicious attack.

It is also known to use application level authentication. For example, the Wi-Fi Protected Access (WPA) standard is designed with a view to improve the security features of the Wired Equivalence Protocol (WEP), the security mechanism specified by the 802.11 standard. Thus, WPA includes two improvements over WEP, namely data encryption using the Temporal Key Integrity Protocol (TKIP), and user authentication using the Extensible Authentication Protocol (EAP). However, operators are generally reluctant to use this type of authentication, or to use it for every protocol message type due to performance impact, and authentication keys management burden. Besides, the authentication mechanism is not an inherent part for some protocols such as MGCP.

There is a need to provide an application layer security mechanism that enables mitigation of a class of DoS attacks which target a given service provider's network infrastructure by using packets that misrepresent them at the application layer as being sourced from a legitimate host of the respective network.

There is also a need to provide an application layer security mechanism for mitigating DoS attacks, which mechanism does not rely on deployment of anti-spoofing solutions provided by other services providers.

SUMMARY OF THE INVENTION

It is an object of the invention to provide an application layer security mechanism that alleviates totally or in part the drawbacks of the currently employed such mechanisms.

Accordingly, the invention provides a method for mitigating a Denial of Service (DoS) attack against an entity in a service provider (SP) domain of a communication network, comprising: maintaining a list with identity data for each legitimate entity in said SP domain, wherein said identity data includes a L5/7 identity for each respective entity; identifying the protocol used by an ingress protocol data unit (PDU) received at a border element of said SP domain from a source outside said SP domain; inspecting the application layer payload of said PDU to extract a source identity data of said source, wherein said source identity data includes a L5/7 identity of said source; and verifying said source identity data against all identity data on said list.

The invention also provides a system for mitigating a Denial of Service (DoS) attack against an entity in a service provider (SP) domain of a communication network, comprising: a border element connected at the edge of said SP domain for identifying the protocol used by an ingress protocol data unit (PDU) received from a source outside said SP domain and verifying a source identity data of said source; and a protocol/proxy control function (PPCF) for applying a security policy to said PDU, if the source identity data identifies said source as illegitimate, based on said source identity data, wherein said identity data is carried in the application layer payload formed according to the protocol used by said ingress PDU.

The ability to detect and mitigate DoS attacks against network infrastructure has a great value to operators and providers of network services. Advantageously, the solution of the invention enables mitigation of a class of DoS attacks which target a given service provider's network infrastructure by using packets that misrepresent themselves at the application level as being sourced from a network node in the service provider's network. Since the identity of nodes in service provider's network nodes is known and their number is limited, the verification is fast and it does not affect the network performance.

Another advantage of the invention is that it does not rely on deployment of IP anti-spoofing mechanisms by other service providers.

Still further, the solution proposed by the invention does not consider Layer 2/3 data (as VLAN tags or source IP address) and thus it works in the presence of network address translation (NAT) or Proxies outside the respective network provider's domain.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

This invention is directed to an application layer ingress filtering of flows incoming in a given domain, which extends the common ingress filtering based on the IP header only, as defined by the "Network Ingress Filtering: Defeating Denial of Service Attacks which employ IP Source Address Spoofing", IETF RFC 2827.

Figure 1:
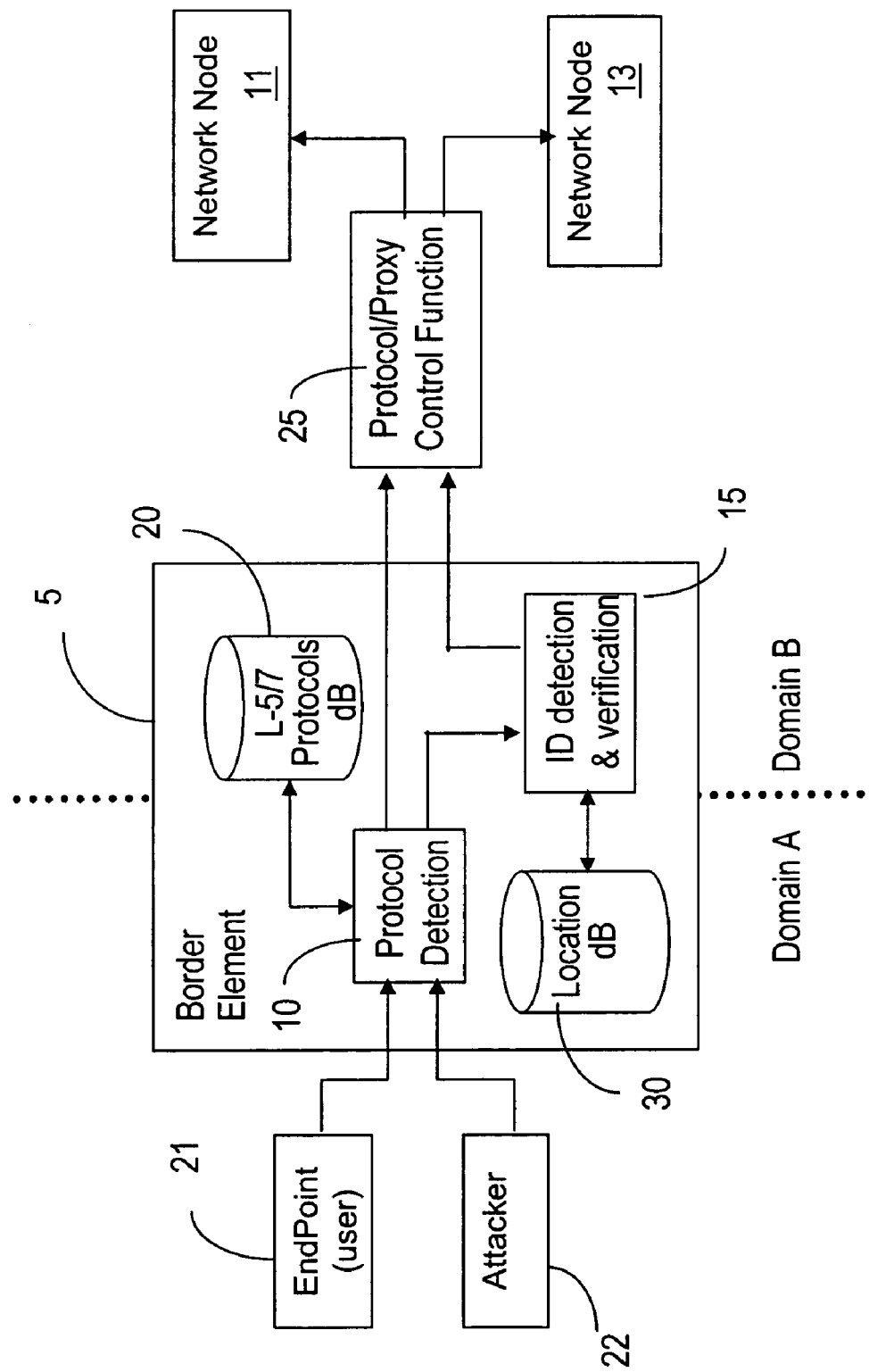
FIG. 1 illustrates the main entities in a L5/7 DoS attack scenario.

FIG. 1 depicts principal entities and communication links for a possible attacking scenario, where the attacker is outside the service provider (SP) network/domain. In this example, one or more nodes 11, 13 in the service provider domain B are targeted by an attacker 22 located in domain A. Domain B generically represents any network/entity in domain B for obtaining a certain communication service from the respective SP. Domain A generically represents any other legitimate and/or illegitimate source of data packets outside domain B. More broadly, domain A refers to the communication environment other than domain B from where service requests to SP may originate. It is also to be noted here that the invention can be used for any type of protocol data units (PDU) or datagrams; the term "packet" in this description is used in a generic sense.

As discussed above, the goal of an attacker could vary. For example, the attacker could try to accomplish a DoS by flooding the network infrastructure or the end-users with irrelevant traffic. It also could attempt to illegitimately obtain a service from SP (Theft of Service) by pretending successfully to be a legitimate end-user. Another type of attack could be conducted with the goal to learn the identities of registered end point (legitimate users of the SP network). The target of the application-level attack can be either the Protocol/Proxy Control Function (PPCF) itself which delivers the targeted service or any other network node 11, 13.

According to the invention, a protocol aware border element 5 is connected at the border of the SP domain B. Any entity, such as legitimate users 21 and malicious attackers 22 in domain A must access domain B through the protocol aware border element 5 to request use and obtain a service provided by SP. The border element 5 is provided with a protocol detection unit 10 and an identity detection and verification unit 15. Protocol detection unit 10 maintains a database 20 with a list of all the L5/7 protocols recognized by the SP, used to determine the protocol type of the incoming packets. The protocols list is updated by adding any new L5/7 protocol of interest to the respective SP, and the respective protocol updates. The protocol detection unit 10 can consider many protocols at the same time, so that protocol detection is quite fast.

ID detection and verification unit 15 extracts the identity contained in the packet application payload (i.e. the payload of the IP packet) from an incoming packet, according to the respective protocol detected by unit 10. The ID detection and verification unit 15 maintains a database 30 with all legitimate entities that can transmit packets to entities in domain B, which it uses for verifying if the source identity of the incoming packets is legitimate. Unit 15 identifies incoming packets as malicious if the respective packet contains a source identity not compliant with the PPCF policy (e.g., identity of a node of domain B which is not registered as a roaming one).

From the service provider point of view, the attacker can use spoofed identities not only from domain B but also form any other domain. In the latter case, the service provider has to build trust relationships with other providers and domain owners and rely on their diligence in order to collect and maintain current the identity in database 30 to enable verification of the authenticity of the sender. Thus, unit 15 may also identify legitimate packets coming from domain A, whose source identifier belongs to a legitimate entity of domain A, if database 30 supports this functionality. Furthermore, unit 15 may also be enabled to identify an entity of domain B that is allowed to roam, so that it will recognize packets incoming from such a mobile entity as legitimate.

Database 30 stores the legitimate source addresses and the IP addresses of all nodes served by the SP. It could also include source identity for legitimate end points outside domain B that communicate customary with entities in domain B, and/or information about which nodes are allowed to roam outside domain B. It is assumed that the list contained in database 30 is maintained current and can be trusted.

In addition, a PPCF 25 protects the network against unauthorized (illegal) use, as detected by unit 15. The PPCF 25 may be for example a specialized server, a signaling gateway, a media gateways, etc. It is also to be noted that the border element 5, PPCF 25 and some of the network nodes can be located on the same platform. However, they represent different functional entities.

Figure 2:
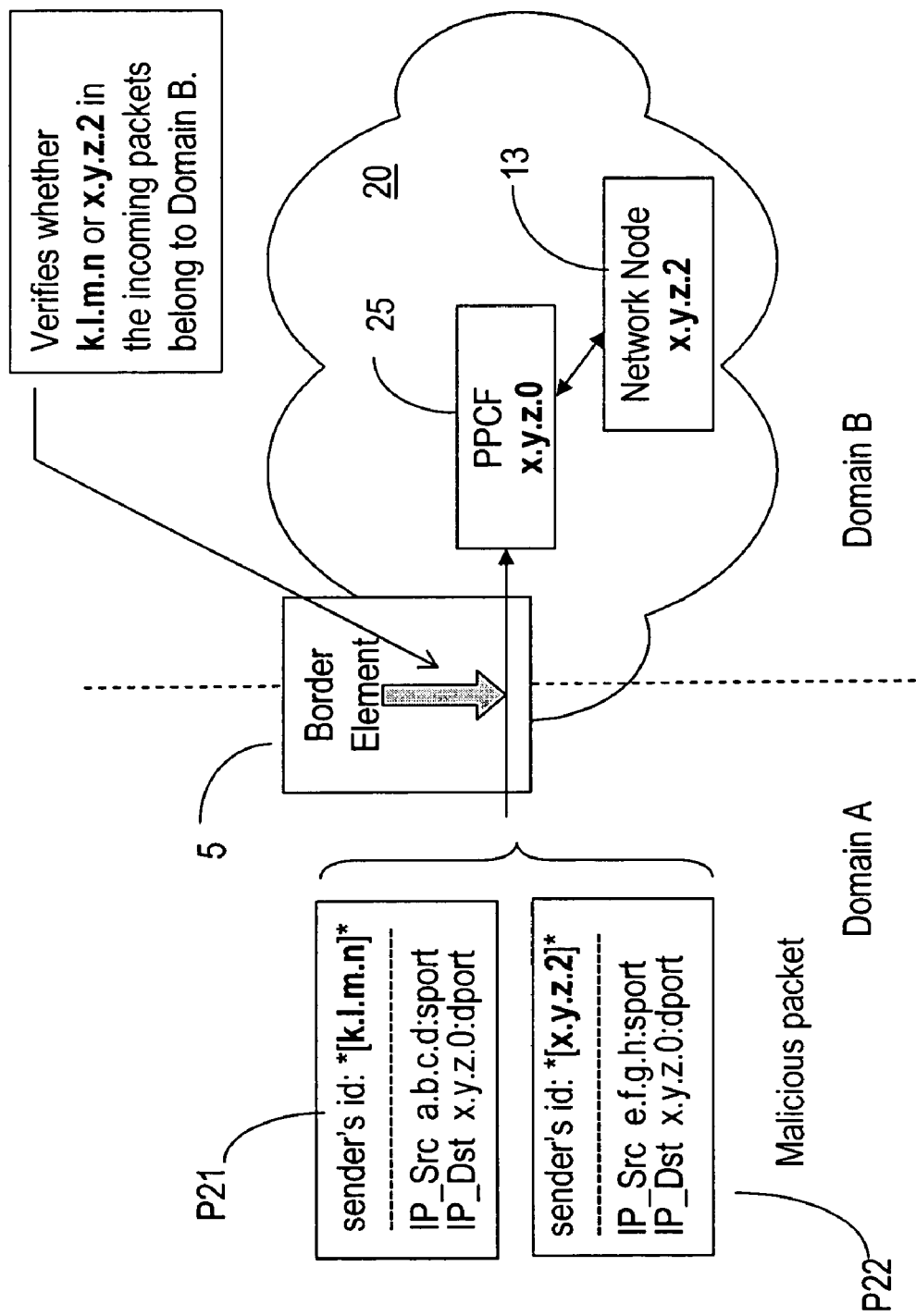
FIG. 2 shows application layer ingress filtering solution according to the invention.

FIG. 2 illustrates the process and the data that is a subject to verification as a core of the proposed solution. In this example, the incoming packets are P21 received from entity 21 of FIG. 1, and P22 received from entity 22. After an incoming packet is identified as relevant to an application protocol of interest, border element 5 determines which domain-specific information is used by the respective application to form the source identity. Next, the identity pertinent to that specific application is extracted from the packet application payload and verified against the legitimate identity stored in database 30. Let's say that the source identity from packet P21 is k.l.m.n and the IP source and IP destination addresses are a.b.c.d:sport and respectively x.y.x.0:dport, while the source identity extracted from packet P22 is x.y.z.2 and the IP source and IP destination addresses are e.f.g.h:sport and respectively x.y.x.0:dport.

The border element 5 then verifies if any of the entities in domain B has the source identity k.l.m.n or x.y.z.2, and determines that node 13 uses the identity x.y.z.2. This means that the packet coming from entity 22 is a malicious packet, and it is subjected to a given security policy (possible actions: reject, rate limit, delay, . . . ) by the PPCF 25. On the other hand, packet P21 is recognized as legitimate, since the source identifier k.l.m.n is not in database 30. If some domain B entities are allowed to roam, the source identity extracted from application payload is compared to all registered network nodes in the service domain B that are allowed to roam.

The approach proposed here is not universal and it is effective against certain range of DoS attacks only. It does not prevent attacks against the service when the packet payload does not claim to originate from the service domain.

We claim:

1. A method for mitigating a Denial of Service (DoS) attack against an entity in a service provider (SP) domain of a communication network, comprising:
    maintaining a list with identity data for each legitimate entity in said SP domain, wherein said identity data includes a L5/7 identity for each respective entity;
    identifying the protocol used by an ingress PDU received at a border element of said SP domain from a source outside said SP domain;
    inspecting the application layer payload of said PDU to extract a source identity data of said source based on the identified protocol, wherein said source identity data includes a L5/7 identity of said source;
    verifying said source identity data against all identity data on said list; and
    determining said PDU to be malicious when said source identity data is found on said list and, in response, applying a security policy to said PDU.

2. The method of claim 1, wherein said step of identifying comprises determining which domain-specific information is used by the respective protocol to form said source identity data.

3. The method of claim 1, wherein said list further includes identity data for a legitimate source outside said SP domain that is allowed to communicate customarily with entities in said SP domain.

4. The method of claim 1, wherein said list identifies an entity in said SP domain that is allowed to roam outside said domain.

5. The method of claim 4, further comprising:
    applying a security policy to said PDU when the source identity is found on said list and when said source identity does not correspond to an entity in said SP domain that is allowed to roam outside said domain.

6. The method of claim 1, wherein said identity data is carried in the application layer payload formed according to the protocol used by said ingress PDU.

7. The method of claim 1, further comprising:
    maintaining, by said border element, a protocol database including all the L5/7 protocols available in said SB domain, to determine the protocol type of said PDU.

8. The method according to claim 7, further comprising updating said protocol database by adding any new L5/7 protocol of interest to the legitimate entities in said SB domain.

9. The method of claim 1, wherein said border element identifies the protocol used by said PDU by considering simultaneously a plurality of protocols from said protocol database at the same time.

10. The method of claim 3, further comprising:
    applying the security policy to said PDU when the source identity is found on said list and said source identity does not correspond to a legitimate source outside said SP domain that is allowed to communicate customarily with entities in said SP domain.

11. A system for mitigating a Denial of Service (DoS) attack against an entity in a service provider (SP) domain of a communication network, comprising:
    a border element connected at the edge of said SB domain for identifying the protocol used by an ingress PDU received from a source outside said SB domain and verifying a source identity data of said source; and
    a protocol/proxy control function (PPCF) for applying a security policy to said PDU when the source identity data identifies said source as illegitimate,
    wherein said identity data is carried in the application layer payload formed according to the protocol used by said ingress PDU, and
    wherein said border element identifies said source as illegitimate when said source identity data is found on a list with identity data for each legitimate entity in said SP domain, said identity data including an L5/7 identity for each respective entity.

12. The system of claim 11, wherein said border element comprises:
- a first database for maintaining said list of legitimate identity data;
- a second database with all the L5/7 protocols available in said SP domain;
- a protocol detection unit for identifying the protocol used by said ingress PDU using said second database; and
- an identification and verification unit for inspecting the application layer payload of said PDU to determine a source identity data of said source that generated said PDU, and verifying said source identity data against said list, wherein said source identity data includes the L5/7 identity of said source.

13. The system of claim 11, wherein said list further includes identity data for a legitimate source outside said SP domain that is allowed to communicate customarily with entities in said SP domain.

14. The system of claim 11, wherein said list identifies an entity in said SP domain that is allowed to roam outside said domain.

15. The system of claim 13, wherein said PPCF applies a security policy to said PDU when the source identity is found on said list and said source identity does not correspond to a legitimate source outside said SP domain that is allowed to communicate customarily with entities in said SP domain.

16. The system of claim 14, wherein said PPCF applies a security policy to said PDU when the source identity is found on said list and said source identity does not correspond to an entity in said SP domain that is allowed to roam outside said domain.

* * * * *

UNITED STATES PATENT AND TRADEMARK OFFICE
CERTIFICATE OF CORRECTION

| | |
|---|---|
| PATENT NO. | : 7,647,623 B2 |
| APPLICATION NO. | : 11/250455 |
| DATED | : January 12, 2010 |
| INVENTOR(S) | : Jean-Marc Robert and Dmitri Vinokurov |

It is certified that error appears in the above-identified patent and that said Letters Patent is hereby corrected as shown below:

Column 6

Claim 7, line 34, "SB" should be "SP".

Claim 8, line 38, "SB" should be "SP".

Claim 11, lines 53 and 54, "SB" should be "SP".

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,647,623 B2
APPLICATION NO. : 11/250455
DATED : January 12, 2010
INVENTOR(S) : Robert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 920 days.

Signed and Sealed this

Twenty-eighth Day of December, 2010

David J. Kappos
*Director of the United States Patent and Trademark Office*